Dec. 20, 1966 TAMIO UEMURA ETAL 3,293,461
ELECTRIC MOTORS OF TOTALLY ENCLOSED TYPE
Filed March 31, 1964
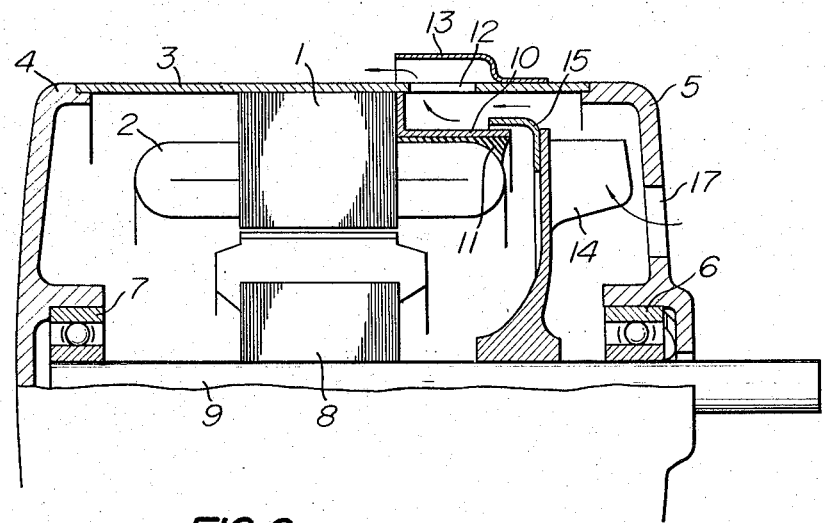
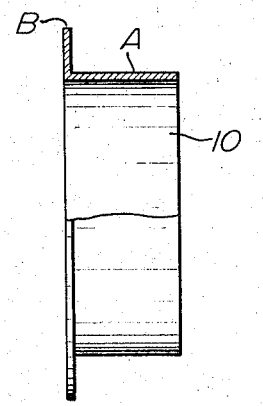
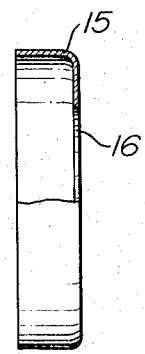
INVENTORS
Tamio Uemura
Yoshiya Miyamoto
By Paul M. Craig Jr.
ATTORNEY United States Patent Office 3,293,461
Patented Dec. 20, 1966

3,293,461
ELECTRIC MOTORS OF TOTALLY
ENCLOSED TYPE
Tamio Uemura, Hitachi-shi, and Yoshiya Miyamoto, Sendai-shi, Japan, assignors to Hitachi, Ltd., Chiyoda-ku, Tokyo, Japan, a corporation of Japan
Filed Mar. 31, 1964, Ser. No. 356,297
Claims priority, application Japan, Apr. 2, 1963, 38/16,280
1 Claim. (Cl. 310—57)

The present invention relates to electric motors and more particularly to those of totally enclosed type whose structure is such that the flow of air thereinside is intercepted from communicating with the flow of ambient air in order to prevent any dust entrained on ambient air from depositing on the stator windings or the rotor.

The primary object of the invention is to provide an electric motor of an improved structure which has a prominent effect of total enclosure and yet can be manufactured at low cost.

Another object of the invention is to provide an electric motor of totally enclosed type in which means are provided to efficiently cool the stator coils therein and to form an air film between stator coil ends and a radial flow fan for preventing the flow of air inside the motor from communicating with the flow of air outside thereof.

According to the invention, there is provided an electric motor of totally enclosed type comprising a radial flow fan mounted for rotation on the rotor shaft for directing cooling air towards the stator coils, a substantially cup-shaped member fixed to said radial flow fan in concentric relation thereto for unitary rotation therewith, a stationary member of substantially cylindrical shape concentrically fixed to the stator core in opposed relation to said rotatable member, said rotatable member having its inside diameter slightly greater than the outside diameter of said stationary member so that a substantial portion of said rotatable member extends in concentrically overlapped relation over said stationary member with an extremely small gap therebetween, and a filler of electrically insulating resinous material having a good thermal conductivity filled in an annular gap defined between said stationary member and radially outer peripheries of the stator end coils.

There are other objects and particularities of the invention which will become obvious from the following description with reference to the accompanying drawings, in which:

FIG. 1 is a side elevational view of the upper half of a totally enclosed electric motor according to the invention, with parts in longitudinal section;

FIG. 2 is a fragmentarily longitudinal sectional side view of a stationary member incorporated in the motor of FIG. 1; and FIG. 3 is a fragmentarily longitudinal sectional side view of a rotatable member incorporated in the motor of FIG. 1.

A preferred embodiment of the invention will now be described with reference to the drawings. In FIG. 1, there is shown a totally enclosed electric motor in which a stator core 1 having thereon stator coils 2 is enclosed in a housing 3.

Open ends of the housing 3 are closed by end brackets 4 and 5. Bearings 6 and 7 are mounted centrally of the respective end brackets 5 and 4 for supporting therein a rotary shaft 9 of a rotor 8 rotatably disposed inside the stator core 1. A stationary member 10 of substantially cylindrical shape is fixed to the stator core 1 in a manner that it covers the outer peripheries of end coils of the stator coils 2. As shown in FIG. 2, the stationary member 10 consists of a cylindrical portion A and an annular flange portion B extending radially outwardly from one end of the cylindrical portion A, and is fixed to the stator core 1 with its flange portion B. An annular gap between the stator coils 2 and the stationary member 10 is hermetically sealed by a mass of an electrically insulating resin 11 having a good thermal conductivity.

A plurality of exhaust ports 12 are formed in the housing 3 at positions radially outwardly of the stationary member 10 and are covered by an exhaust guide member 13 which directs the exhaust outwardly from the motor along the wall of the housing 3. A radial flow fan 14 is fixedly mounted on the rotor shaft 9 for directing cooling air towards the stator coils 2. The cooling air is admitted into the motor housing through an air intake port 17 provided in the end bracket 5 at a position adjacent the bearing 6. On the outer peripheral portion of the radial flow fan 14, there is fixed a member 15 in concentric relation with the rotary shaft 9 for unitary rotation with the fan 14. As shown in FIG. 3, the rotatable member 15 may be preferably of shallow cup-like shape having an opening 16 at its bottom. The rotatable member 15 is disposed opposite the stationary member 10 and has its inside diameter slightly greater than the outside diameter of the stationary member so that a substantial portion of the former overlaps on the latter with a very small gap therebetween.

During the operation of the electric motor, the radial flow fan 14 rotates conjointly with the rotor 8 and draws cooling air through the air intake port 17 to direct it along the stationary member 10. Exhaust is passed through the exhaust ports 12 and guided by the exhaust guide member 13 to be discharged outwardly along the wall of the housing 3. Therefore, heat generated in the stator coils 2 during the operation of the motor and transmitted to the stationary member 10 through the mass of insulating resin 11 can efficiently be transmitted to the cooling air and the cooling effect can thus be improved.

The electric motor with the structure of the invention is quite effective in that, during the operation of the motor, the rotatable member 15 rotates at a high speed and a film of air is formed in the direction of rotation thereof in an extremely small gap between the stationary member 10 and the rotatable member 15. This thin film of air provides a great resistance against communication of air between the inside and the outside of the motor through the gap and thus an excellent effect of total enclosure can be obtained.

It will be understood that the electric motor of the invention is very advantageous in that it can be manufactured at low cost since mere addition of the stationary member 10 and the rotatable member 15 of simple structure can easily attain the effect of total enclosure.

What is claimed is:
An electric motor of the totally enclosed type, comprising,
    a cylindrical housing, a first end bracket having an air intake opening and a second end bracket, each of said end brackets being secured to said housing,
    an annular stator core disposed within said housing and provided with an annular arrangement of stator coils, a rotor shaft rotatably supported at either end by said end brackets, concentric with said stator coil arrangement, and a rotor secured to said shaft,
    a fan having a radial disc portion secured to said shaft between said rotor and said first end bracket, a fan portion disposed on the surface of said disc portion facing said first end bracket, and an annular end portion at the circumference of said disc extending parallel to said rotor shaft,
    a stationary member having an annular portion surrounding the annular arrangement of stator coils, said annular end portion of said fan slightly overlap- ping said fan, slightly overlapping the annular portion of said stationary member to define an annular gap therebetween, and heat conductive electrically insulating material substantially filling the space formed between the annular portion of said stationary member and said arrangement of stator coils thereby securing said stationary member to said stator coil and said stator core and providing support for said stationary member necessary to insure uniformity in said gap, said housing having air outlet means therein adjacent to said stationary member, said annular end portion and said disc portion of said fan being formed of separate members secured to one another, said annular end portion having an L-shaped cross-section, said stationary member having a flange portion abutting one side of said stator core, said annular portion of said stationary member being cylindrical in configuration.

References Cited by the Examiner
UNITED STATES PATENTS

| | | | |
|---|---|---|---|
| 1,677,433 | 7/1928 | Daun | 310—57 |
| 3,075,107 | 1/1963 | Eis et al. | 310—64 |

MILTON O. HIRSHFIELD, *Primary Examiner.*

ORIS L. RADER, *Examiner.*

L. L. SMITH, *Assistant Examiner.*